United States Patent
Zhang et al.

(10) Patent No.: US 10,547,089 B2
(45) Date of Patent: Jan. 28, 2020

(54) OPTIMIZATION OF CRUISING VOLTAGE FOR LIFE AND FUEL ECONOMY PERFORMANCE IN ADVANCED START-STOP SYSTEMS

(71) Applicant: CPS Technology Holdings LLC, New York, NY (US)

(72) Inventors: Zhenli Zhang, Glendale, WI (US); Zhihong H. Jin, Pewaukee, WI (US); Perry M. Wyatt, Fox Point, WI (US)

(73) Assignee: CPS Technology Holdings LLC, New York, NY (US)

( * ) Notice: Subject to any disclaimer, the term of this patent is extended or adjusted under 35 U.S.C. 154(b) by 331 days.

(21) Appl. No.: 15/344,359

(22) Filed: Nov. 4, 2016

(65) Prior Publication Data

US 2017/0120773 A1 May 4, 2017

Related U.S. Application Data

(60) Provisional application No. 62/250,655, filed on Nov. 4, 2015.

(51) Int. Cl.
| | | |
|---|---|---|
| *B60L 11/18* | (2006.01) | |
| *H01M 10/48* | (2006.01) | |
| *H01M 10/42* | (2006.01) | |
| *H01M 10/0525* | (2010.01) | |
| *H01M 10/06* | (2006.01) | |

(Continued)

(52) U.S. Cl.
CPC ............ *H01M 10/482* (2013.01); *B60L 1/00* (2013.01); *B60L 7/10* (2013.01); *B60L 58/12* (2019.02); *B60L 58/20* (2019.02); *B60L 58/22* (2019.02); *H01M 10/0525* (2013.01); *H01M 10/06* (2013.01); *H01M 10/425* (2013.01); *H01M 2010/4271* (2013.01); *H01M 2010/4278* (2013.01); *H01M 2220/20* (2013.01);

(Continued)

(58) Field of Classification Search
CPC combination set(s) only.
See application file for complete search history.

(56) References Cited

U.S. PATENT DOCUMENTS

| | | |
|---|---|---|
| 2007/0029124 A1 | 2/2007 | DasGupta et al. |
| 2008/0084182 A1* | 4/2008 | Oberlin ............... H01M 10/052 320/116 |

(Continued)

FOREIGN PATENT DOCUMENTS

| | | |
|---|---|---|
| DE | 102011000490 | 3/2012 |
| JP | 2002025630 | 1/2002 |
| WO | 2015016965 | 2/2015 |

OTHER PUBLICATIONS

PCT/US2016/060690 International Search Report and Written Opinion dated Feb. 23, 2017.

*Primary Examiner* — Christopher P Domone
(74) *Attorney, Agent, or Firm* — Boardman & Clark LLP

(57) ABSTRACT

A battery system may include multiple battery cells having different chemistries. To achieve certain performance goals, voltage parameters for the battery system, such as cruising voltages and maximum voltages can be adjusted. These adjustments may, for example, direct charging currents to a lithium-ion battery to increase fuel economy or may direct charging currents away from a lithium-ion battery to increase its longevity. Methods for matching batteries having different chemistries based on their open circuit voltages are also discussed.

20 Claims, 10 Drawing Sheets

(51) Int. Cl.
*B60L 1/00* (2006.01)
*B60L 7/10* (2006.01)
*B60L 58/12* (2019.01)
*B60L 58/22* (2019.01)
*B60L 58/20* (2019.01)

(52) U.S. Cl.
CPC ........ *Y02T 10/7011* (2013.01); *Y02T 10/7016* (2013.01); *Y02T 10/7061* (2013.01)

(56) References Cited

U.S. PATENT DOCUMENTS

| | | | |
|---|---|---|---|
| 2009/0317696 A1* | 12/2009 | Chang | H01M 10/052 429/61 |
| 2011/0288704 A1* | 11/2011 | Schwarz | H01M 10/625 701/22 |
| 2014/0091767 A1 | 4/2014 | Tamura et al. | |
| 2015/0191139 A1 | 7/2015 | Schindler et al. | |
| 2015/0239365 A1 | 8/2015 | Hyde et al. | |
| 2016/0082858 A1* | 3/2016 | Yang | H02J 1/10 318/139 |

* cited by examiner

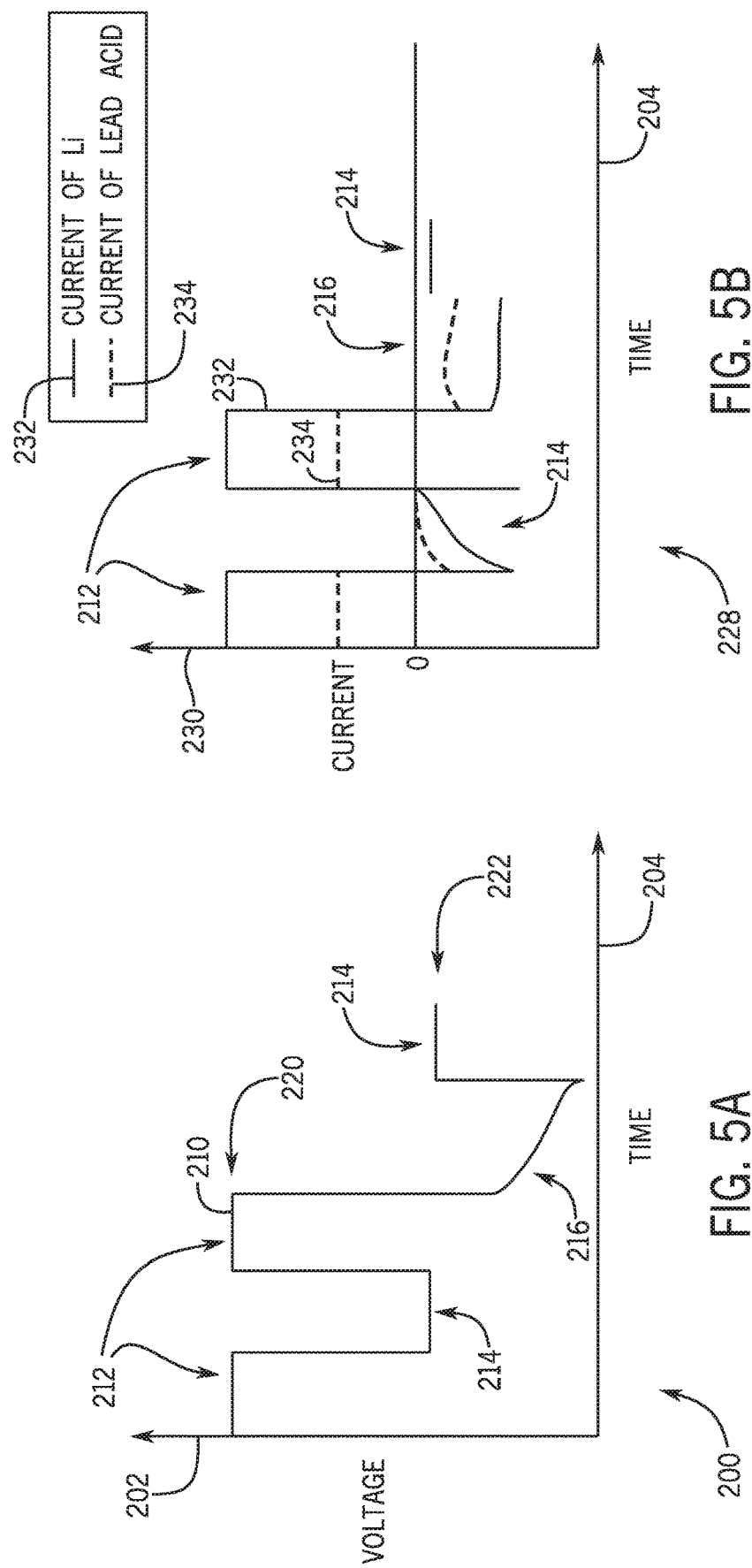

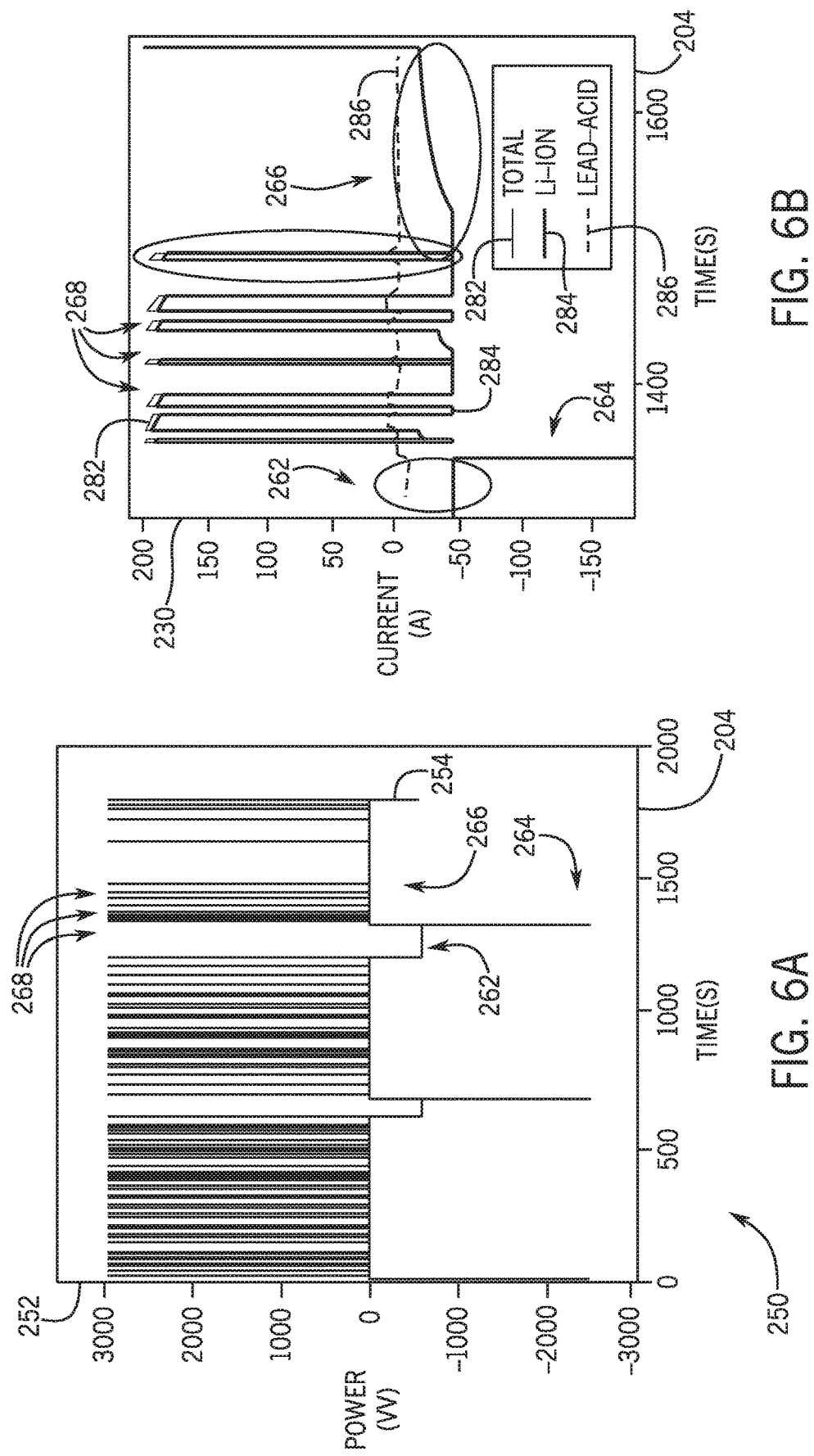

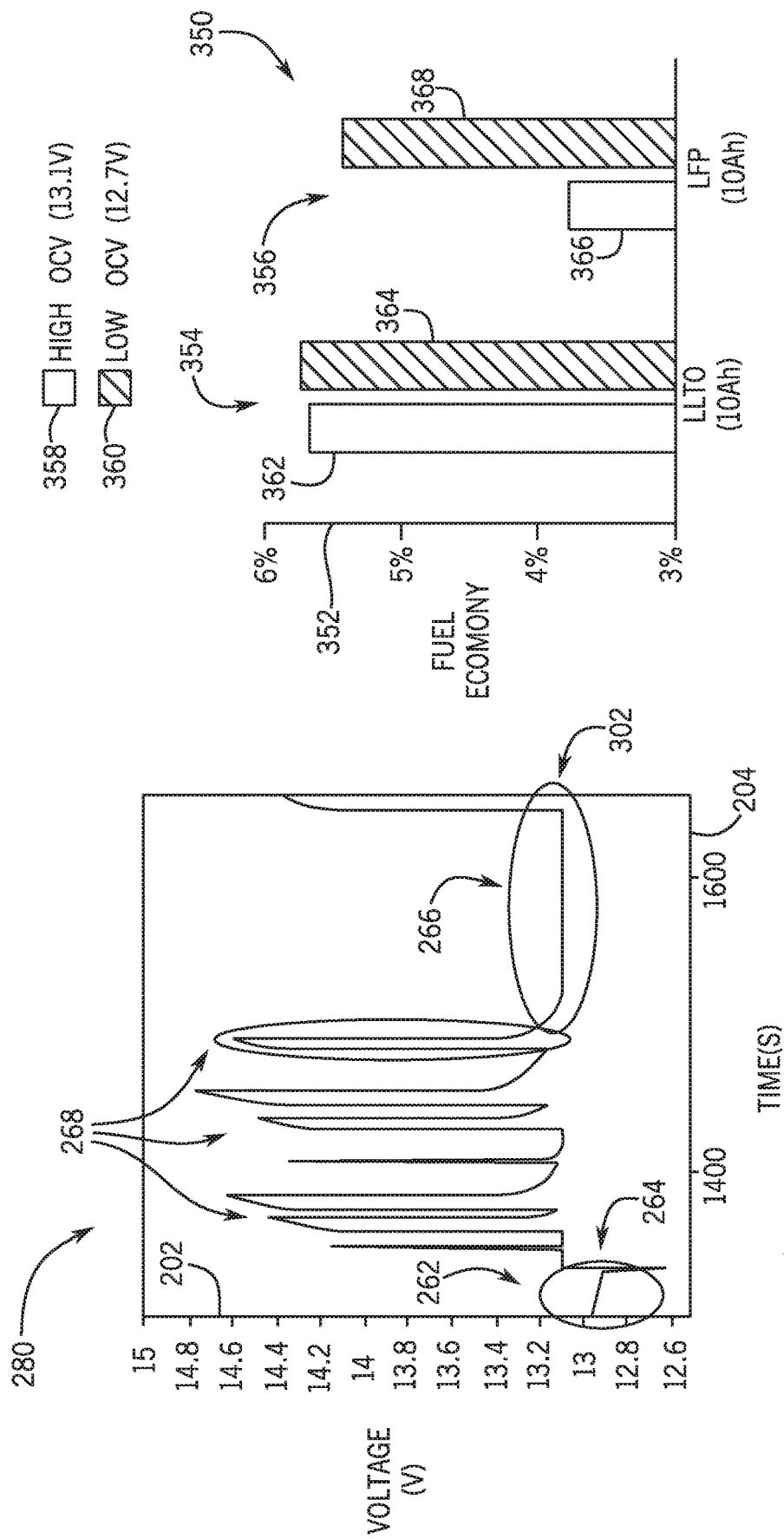

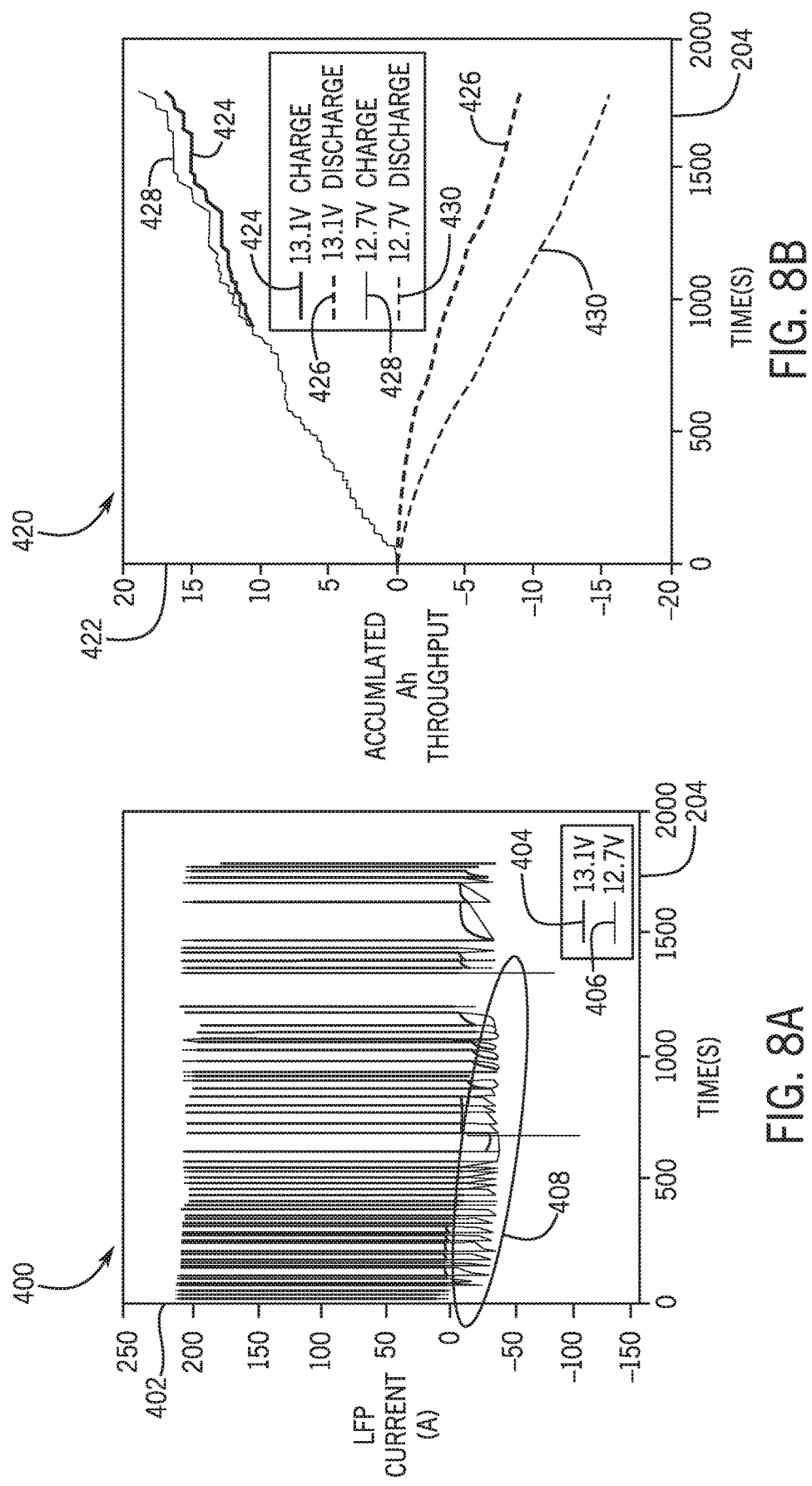

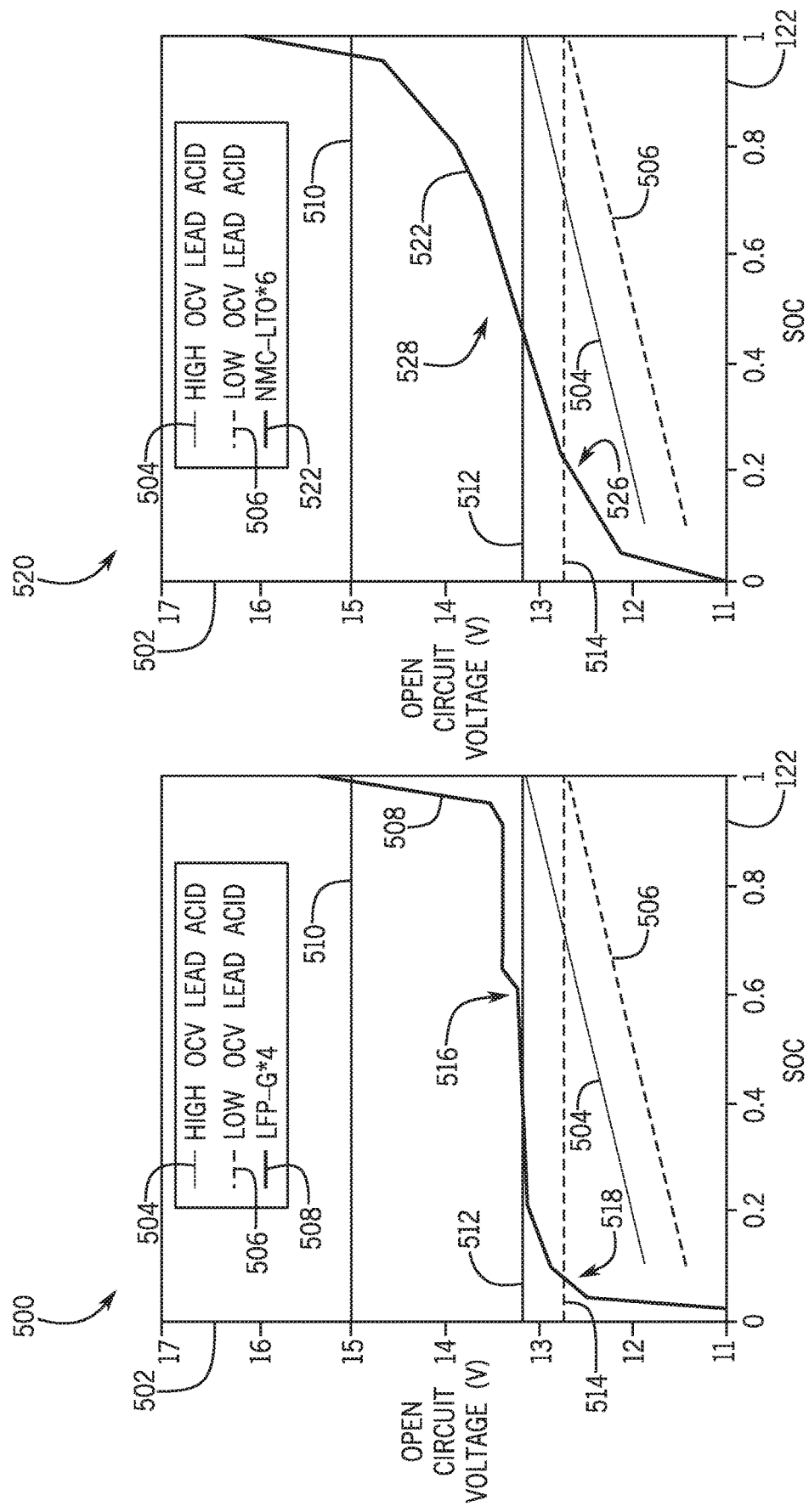

OPTIMIZATION OF CRUISING VOLTAGE FOR LIFE AND FUEL ECONOMY PERFORMANCE IN ADVANCED START-STOP SYSTEMS

CROSS-REFERENCE

This application claims priority to and the benefit of U.S. Provisional Application Ser. No. 62/250,655, entitled "OPTIMIZATION OF CRUISING VOLTAGE FOR LIFE AND FUEL ECONOMY PERFORMANCE FOR ADVANCED START STOP SYSTEM," filed Nov. 4, 2015, which is hereby incorporated by reference in its entirety for all purposes.

BACKGROUND

The present disclosure generally relates to the field of batteries and battery modules. More specifically, the present disclosure relates to methods to obtain improved fuel economy and battery life in systems employing battery systems with battery modules having different chemistries.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Further, a micro-hybrid electric vehicle (mHEV) also uses a "Stop-Start" system similar to the mild hybrids, but the micro-hybrid systems of a mHEV may or may not supply power assist to the internal combustion engine. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

In addition to use in vehicles (e.g., vehicles, boats, trucks, motorcycles, and airplanes), advances in battery technology and rechargeable batteries are more frequently being used in what may be referred to as stationary battery applications. Applications for stationary batteries, which are often used in backup or supplemental power generation, are becoming more widespread with improvements in rechargeable aspects of batteries and with the lowering of prices for such technology. For example, stationary batteries may be utilized for industrial and/or household applications. Such applications may include DC power plants, substations, back-up power generators, transmission distribution, solar power collection, and grid supply.

Managing energy storage systems to achieve optimal performance can be a challenge especially when service conditions vary and components age. As technology continues to evolve, there is a need to provide improved management of the state and capacity for battery modules of such vehicles, stationary battery applications or systems, and other battery systems to improve energy utilization and battery lifetime. For example, the electric power used by xEVs may be provided by battery systems that include cells using batteries with different chemistries. The different battery chemistries may have different electrical properties such as charging capacity and capacities and which may provide complementary characteristics to improve the performance of the system. For example, a battery system may have a lithium-ion battery, which allows efficient recharging, and a lead-acid battery, which has a better discharge performance (e.g., for cold cranking an engine).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a dual battery system. The battery system may include a lead-acid battery and a lithium-ion battery that are both arranged in parallel and coupled to an electrical system. The battery system may also include a battery control module that may receive battery data from the lead-acid and the lithium-ion batteries. The battery control module may also receive a performance target and, based on the received data and performance target, recommend a cruising voltage.

The present disclosure also relates to an energy storage for a vehicle that may have a battery system coupled to a power bus of the vehicle that includes two batteries arranged in parallel. The energy system also includes a vehicle control module coupled to the electrical system of the vehicle that can receive data from the battery system and from the vehicle and calculate recommended voltages for the power bus based on the data received.

The present disclosure also relates to a non-transitory computer readable medium of a battery control module that stores instructions executable by a processor. The instructions may include instructions to cause the processor to receive data for a lead-acid battery and for a lithium-ion battery. The processor may receive a performance target and calculate a recommended cruising voltage based on the data received.

DRAWINGS

Various aspects of this disclosure may be better understood upon reading the following detailed description and upon reference to the drawings in which:

FIGS. 5A and 5B are charts illustrating voltages and currents in different components of the battery system of FIG. 3 during usage, in accordance with an embodiment;

Figure 3:
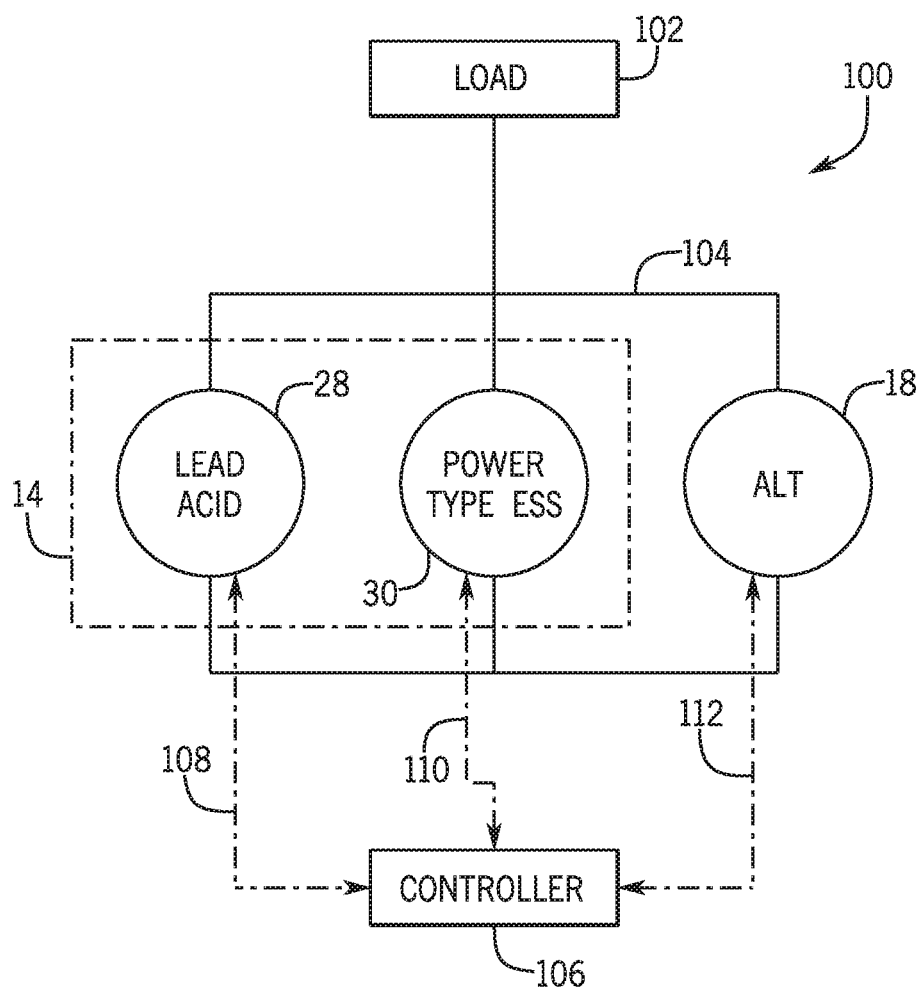
FIG. 3 is an electrical diagram of a battery system having a controller that manages maximum charging voltages and/or cruising voltages, in accordance with an embodiment.
Figure 10:
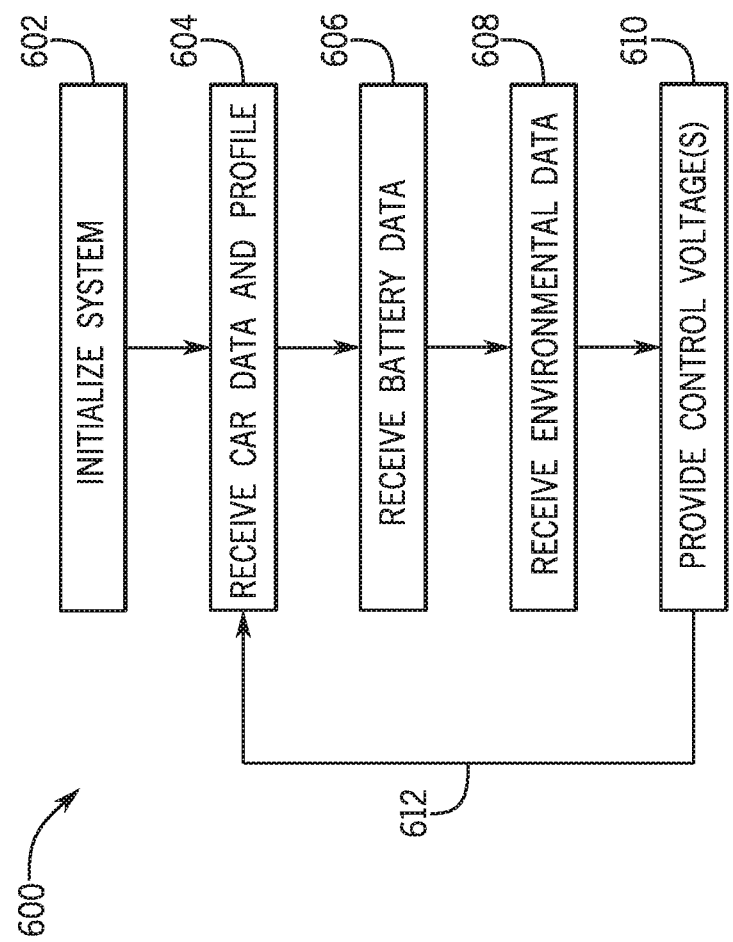

FIGS. 6A, 6B, and 6C are charts illustrating power, voltage and currents in different components of the dual battery system of FIG. 3 during different usage events, in accordance with an embodiment;

FIG. 7 is a chart that illustrates a fuel economy that may be achieved with management of cruising voltages during operation of embodiments of the battery system of FIG. 3, in accordance with an embodiment;

FIG. 8A-D are charts illustrating current, charge throughput, SOC, and voltage of different components of the battery system of FIG. 3, in accordance with an embodiment;

FIGS. 9A and 9B are charts illustrating the effect of management of cruising voltages in the open circuit voltage (OCV) and SOC of batteries with different chemistry types used in the battery system of FIG. 3, in accordance with and embodiment; and FIG. 10 illustrates a method of managing the maximum charging voltages and/or cruising voltages of the dual battery system of FIG. 3.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of a xEV. As another example, battery modules in accordance with present embodiments may be incorporated with or provide power to stationary power systems (e.g., non-automotive systems).

Based on the advantages over traditional gas-powered vehicles, manufactures, which generally produce traditional gas-powered vehicles, may desire to utilize improved vehicle technologies (e.g., regenerative braking technology) within their vehicle lines. Often, these manufacturers may utilize one of their traditional vehicle platforms as a starting point. In accordance with aspects of the present disclosure, since traditional gas-powered vehicles are designed to utilize 12 volt battery systems, a 12 volt lithium ion battery may be used to supplement a 12 volt lead-acid battery. More specifically, the 12 volt lithium ion battery may be used to more efficiently capture electrical energy generated during regenerative braking and subsequently supply electrical energy to power the vehicle's electrical system.

As advancements occur with vehicle technologies, high voltage electrical devices may also be included in the vehicle's electrical system. For example, the lithium ion battery may supply electrical energy to an electric motor in a mild-hybrid vehicle. Often, these high voltage electrical devices utilize voltage greater than 12 volts, for example, up to 48 volts. Accordingly, in some embodiments, the output voltage of a 12 volt lithium ion battery may be boosted using a DC-DC converter to supply power to the high voltage devices. Additionally or alternatively, a 48 volt lithium ion battery may be used to supplement a 12 volt lead-acid battery. More specifically, the 48 volt lithium ion battery may be used to more efficiently capture electrical energy generated during regenerative braking and subsequently supply electrical energy to power the high voltage devices.

Thus, the design choice regarding whether to utilize a 12 volt lithium ion battery or a 48 volt lithium ion battery may depend directly on the electrical devices included in a particular vehicle. Nevertheless, although the voltage characteristics may differ, the operational principles of a 12 volt lithium ion battery and a 48 volt lithium ion battery are generally similar. More specifically, as described above, both may be used to capture electrical energy during regenerative braking and subsequently supply electrical energy to power electrical devices in the vehicle.

To simplify the following discussion, the present techniques will be described in relation to a dual battery system with a 12 volt lithium ion battery and a 12 volt lead-acid battery. However, one of ordinary skill in art is able to adapt the present techniques to other battery systems, such as a battery system with a 48 volt lithium ion battery and a 12 volt lead-acid battery. Note also that, lithium ion batteries is intended to refer to different types of batteries that may have an anode or a cathode that includes a lithium alloy or salt such as lithium iron phosphate or lithium ferrophosphate (LFP), a lithium cobalt oxide (LCO), a lithium manganese oxide (LMO), a lithium nickel manganese cobalt oxide (NMC), a lithium nickel cobalt aluminum oxide, a lithium titanate (LTO) or other materials that may be used to form a battery.

In advanced start-stop vehicles, certain battery systems may use energy storage systems (ESS), such as lithium-ion batteries, to accept regenerative braking energy in a more efficient manner. In dual chemistry battery systems, such as the ones discussed above, a lead-acid battery may be arranged in parallel with the ESS. Both batteries may operate in a complimentary manner. The ESS may be capable of accepting charge during recharging events in a more efficient manner (e.g., during regenerative braking), whereas the lead-acid battery may be a better solution to relatively quick discharge currents (e.g., current for cold cranking). Since the ESS may be more efficient during recharging, the performance of the dual battery may be improved by directing currents to the ESS during a recharge event. The present disclosure relates methods and systems that may provide a management of a dual battery system by managing voltage levels related to operation of the dual battery system. Voltage levels that may adjusted include the maximum charging voltage level and a cruising voltage level. The present disclosure describes systems that allow for dynamic adjustments of particular voltage levels that balance increased vehicle fuel economy with longer battery life span.

To improve the efficiency in vehicle performance, the methods and systems for battery management described herein adjust voltage levels in the electrical circuit of the dual battery system, as detailed below. Furthermore, the management of the voltage levels in the electrical circuit may be based on, by way of non-limiting example, performance goals, environmental conditions, characteristics of the vehicle and the state of the cells in the battery. In some implementations, managed voltages may be adjusted to achieve a desired performance depending on chemistry, temperatures, current, and other characteristics of ESS that can be diagnosed or pre-loaded. The methods disclosed herein may allow dynamic adjustment of these voltage levels.

Figure 1:
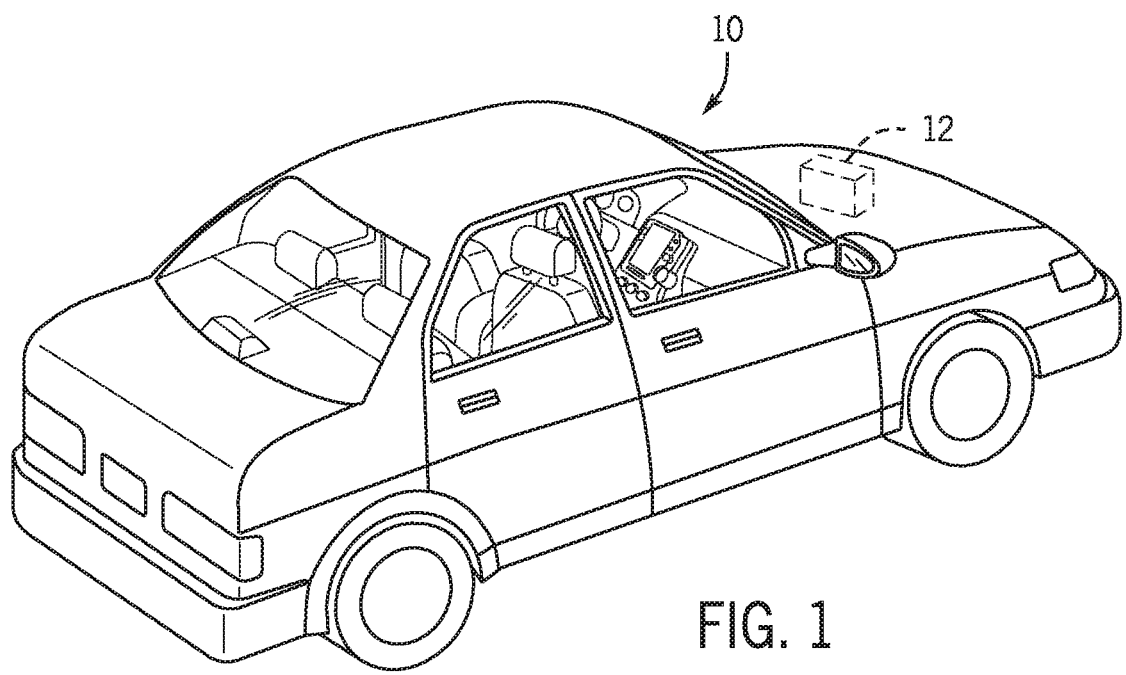
FIG. 1 is perspective view of a vehicle (an xEV) having a battery system contributing all or a portion of the power for the vehicle and using a managed cruising voltage, in accordance with an embodiment.

To help illustrate, FIG. 1 is a perspective view of an embodiment of a vehicle 10, which may utilize a regenerative braking system for recharge. Although the following discussion is presented in relation to vehicles with regenerative braking systems, the techniques described herein are adaptable to other vehicles that capture/store electrical energy with a battery, which may include electric-powered and gas-powered vehicles. Further, the techniques described herein may also be adaptable to other high voltage energy storage/expending applications, such as stationary battery systems (e.g., electrical grid power storage systems). In these systems, the maximum charging voltage may be related to a maximum voltage to be used during charging of the ESS and a cruising voltage event that may be related to a minimum voltage that prevents full discharge of the ESS.

As discussed above, it may be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 1 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
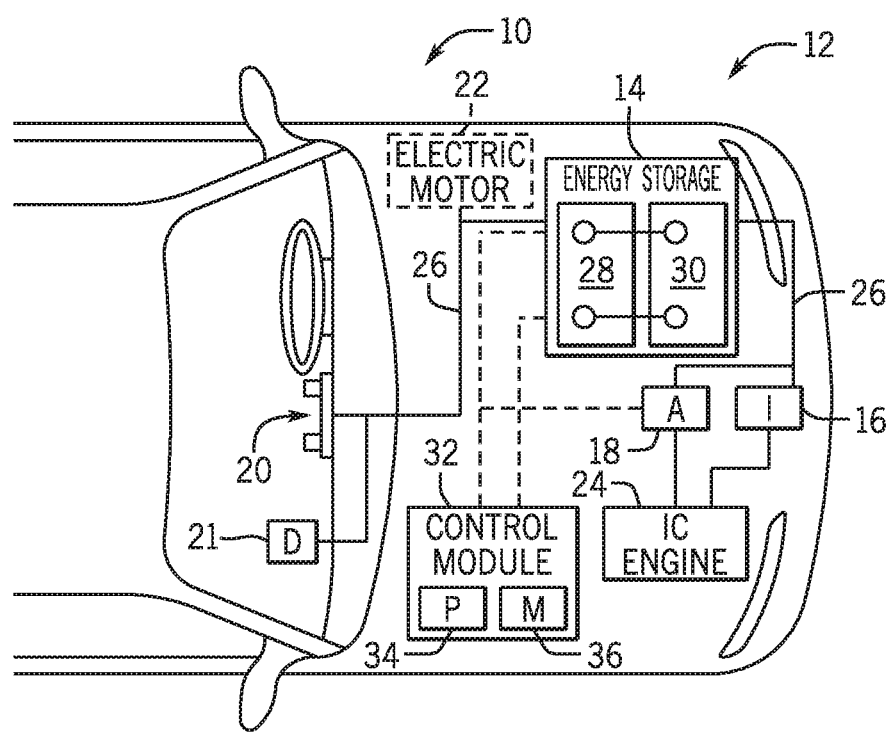
FIG. 2 is a cutaway schematic view of the xEV of FIG. 1 includes a battery system using managed maximum charging voltages and/or cruising voltages, in accordance with an embodiment.

A more detailed view of an embodiment of battery system 12 of the vehicle 10 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture and/or store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20, a display 21 within the vehicle, and the ignition system 16, which may be used to start (e.g., crank) an internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running More specifically, the alternator 18 may convert the mechanical energy produced by the rotation of the internal combustion engine 24 into electrical energy. Additionally or alternatively, when the vehicle 10 includes the electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator 18 and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20. Accordingly, when a 12 volt battery system 12 is used, the bus 26 may provide electrical power typically between 8 and 18 volts. The voltage of the bus 12 may be managed by methods described below to improve the performance of vehicle 10.

Additionally, as depicted, the energy storage component 14 may include multiple battery modules. For example, in the depicted embodiment, the energy storage component 14 includes a lead acid battery module 28, and a lithium-ion battery module 30, where each battery module 28, 30 includes one or more battery cells. In other embodiments, the energy storage component 14 may include any number of battery modules. Additionally, although the lead acid battery module 28 and the lithium-ion battery module 30 are depicted adjacent to one another, they may be positioned in different areas around the vehicle. For example, the lithium-ion battery module 30 may be positioned in or about the interior of the vehicle 10 while the lead acid battery module 28 may be positioned under the hood of the vehicle 10.

As discussed above, the energy storage component 14 may include multiple battery modules to utilize multiple different battery chemistries. For example, the lead acid battery module 28 may utilize a lead-acid battery chemistry and the lithium-ion battery module 30 may utilize a lithium ion battery chemistry. In such an embodiment, the performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved by directing charging currents to lithium-ion battery module 30. Note that the lead-acid battery module 28 may have higher charge capacity and higher cold cranking capacity providing a complement to the lithium-ion battery module 30, which usually has lower capacity. The efficiency of battery system 12 may be further improved by active management of voltages of the energy storage component 14 such that lithium-ion battery module 30 is used for charging and providing energy to low-power electrical device in the vehicle and the lead-acid battery module is used for cranking and other high-discharge powered demands, as discussed below.

To facilitate control and management of voltage levels in the bus 26 and in the energy storage component 14, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate an amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, determine a predicted temperature trajectory of either battery module 28 or 30, determine predicted life span of either battery module 28 or 30, determine fuel economy contribution by either battery module 28 or 30, control magnitude of voltage or current output by the alternator 18 and/or the electric motor 22, and the like. The control module 32 may further store battery profile data, such as open circuit voltage (OCV) profile, state of charge based on the constituent cells of the battery. The data obtained from the vehicle may be used dynamically to adjust voltages and currents in the terminals of the energy storage component 14 to obtain a desired life span for the battery or a desired fuel economy, as detailed below.

Accordingly, the control module 32 may include one or more processors 34 and one or more memories 36. More specifically, the one or more processors 34 may include one or more application specific integrated circuits (ASICs), one or more field programmable gate arrays (FPGAs), one or more general purpose processors, or any combination thereof. Generally, the processor 34 may perform computer-readable instructions related to the processes described herein. Additionally, the processor 34 may be a fixed-point processor or a floating-point processor. The one or more memories 36 may include volatile memory, such as random access memory (RAM), and/or non-volatile memory, such as read-only memory (ROM), optical drives, hard disc drives, or solid-state drives. In some embodiments, the control module 32 may include portions of a vehicle control unit (VCU) and/or a separate battery control module. Additionally, as depicted, the control module 32 may be included separate from the energy storage component 14, such as a standalone module. In other embodiments, the battery management system 36 may be included within the energy storage component 14.

In certain embodiments, the control module 32 or the processor 34 may receive data from various sensors disposed within and/or around the energy storage component 14. The sensors may include a variety of sensors for measuring current, voltage, temperature, and the like regarding the battery module 28 or 30. After receiving data from the sensors, the processor 34 may convert raw data into estimations of parameters of the battery modules 28 and 30. As such, the processor 34 may render the raw data into data that may provide an operator of the vehicle 10 with valuable information pertaining to operations of the battery system 12, and the information pertaining to the operations of the battery system 12 may be displayed on the display 21. The display 21 may display various images generated by device 10, such as a GUI for an operating system or image data (including still images and video data). The display 21 may be any suitable type of display, such as a liquid crystal display (LCD), plasma display, or an organic light emitting diode (OLED) display, for example. Additionally, the display 21 may include a touch-sensitive element that may provide inputs to adjust parameters of the control module 32 or data processed by the processor 34.

The energy storage component 14 may have dimensions comparable to those of a typical lead-acid battery to limit modifications to the vehicle 10 design to accommodate the battery system 12. As depicted, the energy storage component 14 may be included within a single continuous housing. In other embodiments, the energy storage component 14 may include multiple housings coupled together (e.g., a first housing including the lead-acid battery module 28 and a second housing including the lithium-ion battery module 30). In still other embodiments, as mentioned above, the energy storage component 14 may include the lead acid battery module 28 located under the hood of the vehicle 10, and the lithium-ion battery module 30 may be located within the interior of the vehicle 10.

As discussed above, the energy storage component 14 is part of an electrical circuit in vehicle 10. FIG. 3 provides a schematic electrical diagram 100 including the energy storage component 14 formed by the lead-acid battery module 28 and the lithium-ion battery module 30. In the diagram, lead-acid battery module 28 and lithium-ion battery module 30 may be arranged in parallel with the alternator 18, and all these components may be used to power a load 102 via a power bus 104. Ignition load (i.e., cranking) may be modeled in the load 102. In further embodiments, during charging events, such as a regenerative braking event, the load 102 may provide energy to the energy storage component 14. As mentioned above in the discussion of FIG. 2, a controller 106 may regulate and/or receive signals and measurements from the lead-acid battery module 28 via a data bus 108, the ESS 30 via a data bus 110 and the alternator 18 via a data bus 112. Note that the parallel arrangement between the different cell types (e.g., lead-acid battery module 28 and ESS 30) of the energy storage component 14 may be a passive arrangement. In such systems, the controller 106 may control the hybrid system 14 as a whole, without controlling individually the constituent battery modules 28 and 30. As a result of a passive parallel arrangement, active management of the split of currents between the cells may be accomplished by a management of the voltages in the power bus 104 and/or the terminals of the energy storage component 14, as detailed below.

Figure 4B:
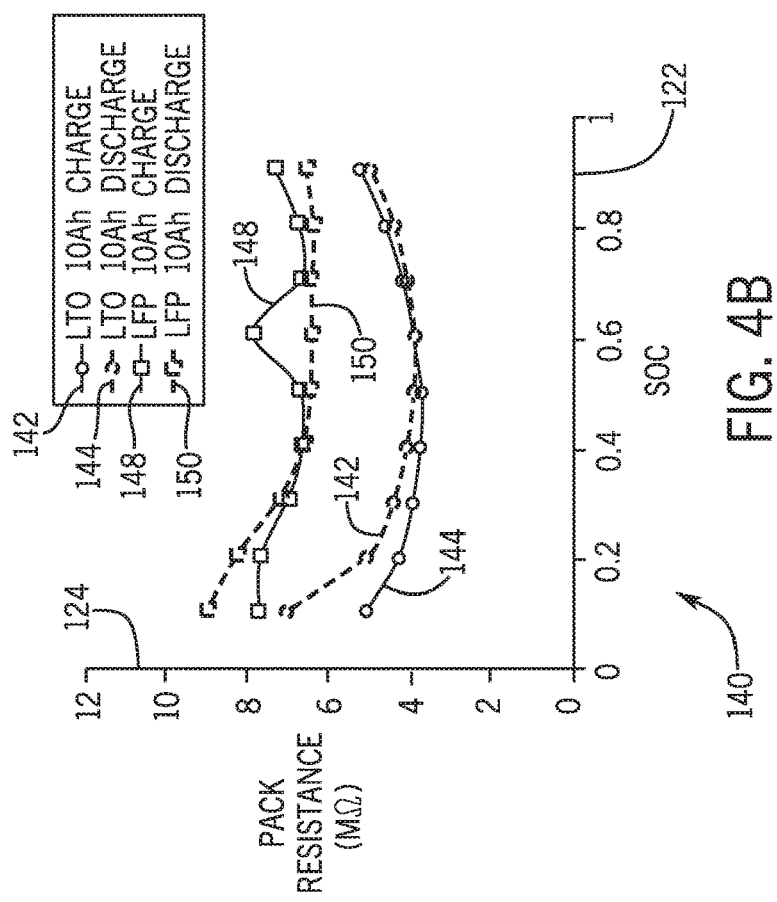
FIGS. 4A and 4B are charts that illustrate a resistance of a battery in function of its State-of-Charge (SOC) for different types of battery chemistries and that may be used to in the battery system of FIG. 3, in accordance with an embodiment.
Figure 4A:
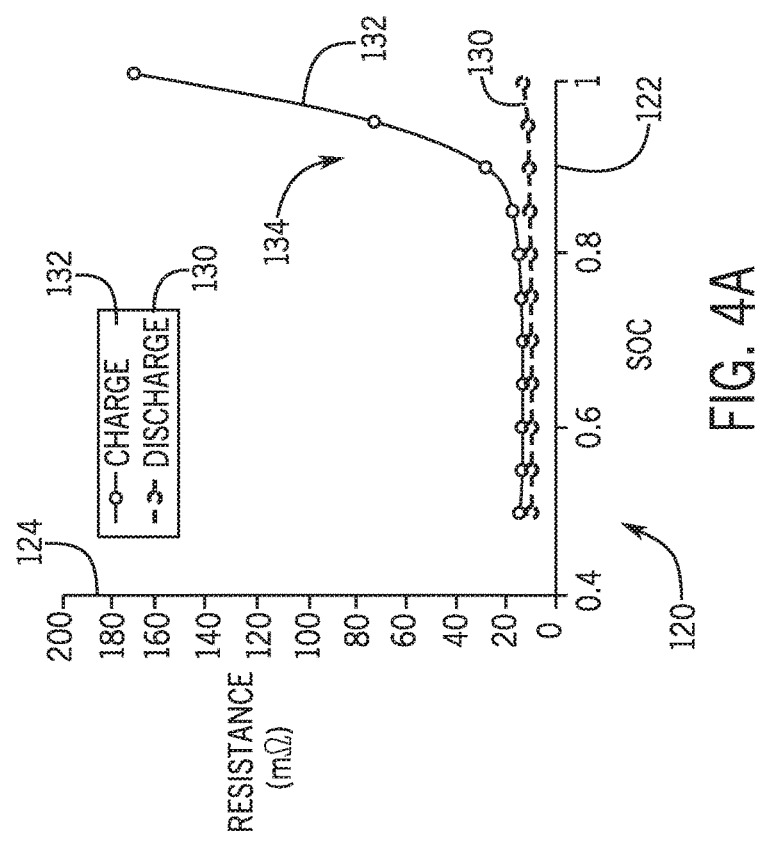

A management of the flows of currents during usage and recharging may improve the efficiency of the batteries due to differences in the electrical properties provided by different chemistries. FIG. 4A provides a chart 120 that shows the galvanic resistance 124 of a lead acid battery as a function of the state-of-charge (SOC) 122 of the battery. The resistance 124 is presented both during discharge 130 and charge 132. In a vehicle application, the discharge 130 may correspond to normal power consumption by the vehicle and a charge 132 may correspond to a regenerative braking, or recharging by the alternator. Note that while the resistance 122 during discharge 130 is approximately constant, resistance 122 has a sharp increase 134 by more than an order of magnitude as the SOC increases above 80%. As a result charging currents may not be efficient for lead-acid batteries at higher SOC values.

By contrast, lithium-ion batteries may present a better performance (i.e., lower resistance) for charging throughout the entire SOC range. FIG. 4B provides a chart 140 that presents the resistance 124 of lithium-ion batteries as a function of the SOC 122. The chart 140 provides resistance 124 during a charge cycle for an NMC-LTO battery (hereinafter LTO battery) 142, a discharge cycle for an LTO battery 144, a charge cycle for an LFP battery 148 and a discharge cycle for a graphite-LFP battery (hereinafter LFP battery) 150. As can be seen in the diagram, the resistance 124 remains approximately within the same order of magnitude throughout the entire SOC range. As a result, the lithium-ion battery module 30 is capable of efficiently receiving and storing energy from charging currents at any SOC.

As mentioned above, in a dual battery system having a passive parallel arrangement, the current split between the different constituent cells may not be controlled directly, but may be managed by voltages in the dual battery system terminals. FIGS. 5A and 5B illustrates such a situation in which currents are directed towards the lithium-ion battery by setting an appropriate cruising voltage. FIG. 5A provides a chart 200 of a voltage 202 as a function of time 204 in a dual battery system including a lead-acid battery and a lithium-ion battery. Curve 210 illustrates the voltage of the electrical storage component as the vehicle undergoes events such as braking events 210, cruising events 214 and stopping events 216. A controller (e.g., the controller of FIG. 3) that manages the battery system 12 may control a maximum voltage level 220 and a cruising voltage level 222 to improve performance of the battery system with respect to a desired goal, as detailed below. The maximum charging voltage level 220 is a top voltage limit for charging events, such as a regenerative braking event, and may be used to protect batteries from being overcharged. The cruising voltage level 222 may be the operating voltage of the alternator. For example, if the SOC of the lead-acid or the lithium-ion battery is such that its output voltage is below the cruising voltage level 222, the alternator may be the used to provide power to the load 102 of the vehicle.

FIG. 5B provides chart 228 that illustrates the flow of currents 230 as a function of time that corresponds to the voltages illustrated in chart 200. Chart 228 shows the current flows for the lithium ion battery 232 and the lead-acid battery 234. The series of events illustrated in charts 200 and 228 provide an illustration of the effect of managing a maximum voltage 220 and a cruising voltage 222. For example, during braking events 212 the voltage (curve 210) becomes equal to the maximum voltage 220 due to regenerative braking. During these braking events 212, the currents accepted by the lithium ion battery 232 are larger than the currents accepted by the lead-acid battery 234. This split in the flow of currents may be achieved by managing the cruising voltage 222 to be set to a value similar to the lead-acid battery OCV at high SOC (e.g., greater than 80%). As discussed above, at high SOC, lead-acid batteries present a large charging resistance which results in the lithium-ion battery receiving a larger share of the charging current.

As the vehicle enters a cruising event 214 (e.g., vehicle running with no regenerative braking) both batteries may provide current to the electrical circuit of the vehicle with the voltage (curve 210) at the cruising voltage 222. Since a large portion of the energy from braking events 212 was stored in the lithium-ion battery, the current provided by the lithium ion battery 232 starts at a larger magnitude (i.e., lower value) than the current provided by the lead-acid battery 234. As the stored charge from both batteries is used, the currents provided by the lithium-ion battery 232 and the lead-acid battery 234 approach zero, which may correspond to a situation in which the alternator supplies electrical power.

During a stop event 216 (e.g., when the vehicle stops), the current from the lithium-ion battery 232 and lead-acid battery 234 is continuously consumed as can be seen by the negative current in chart 228 during stop event 216. In this situation, the alternator is not capable of providing energy, as the engine of the vehicle is not running. As a result, the voltage (curve 210) provided across the terminals of the battery system drops. Note that in the cruise event 214 that follows the stop event 216, the voltage (curve 210) returns to the cruising voltage level 222 set by the alternator. The current of both the lithium-ion battery 232 and the lead-acid battery 234 become very low, which may be a result of a cranking of the engine. Note that the cruising voltage level 222 may determine a cruising SOC for the lead acid battery and for the lithium-ion battery during a cruising equilibrium. The management of the cruising SOC may allow management of the flow of currents between the battery types that are part of the battery system during charging events. In some situations, a higher cruising voltage may increase the cruising SOC of the lithium-ion battery, which may decrease the amount of current received by the lithium-ion battery during a regenerative braking event. On the other hand, in some situations a higher cruising voltage may also increase the SOC of the lead-acid battery which increases the lead-acid battery resistance and may direct the current towards the lithium-ion battery. Discussion of specific methods to manage the battery system are described with respect to FIGS. 9A, 9B, and FIG. 10.

FIGS. 6A, 6B and 6C illustrate certain electrical characteristics of a battery system generated via a vehicle simulation. Specifically, a vehicle having a dual battery system as described herein was simulated over a driving cycle. Chart 250 in FIG. 6A illustrates a power 252 that flows through the battery system as a function of time 204. The illustrated simulation shows the battery system power 254 during events such as stop events 262, starting events 264, cruising events 266 and braking events 268. Note that during cruising events 266, the battery does not receive or provide any charge. During stop events 262 and start events 264, the vehicle uses battery system power 254 (i.e., negative power values). During braking events 268, the vehicle provides battery system power 254, which may be due to a regenerative braking event or any other event that occurs in a vehicle that may be used to harvest power.

FIGS. 6B and 6C focus on a period of time to further illustrate aspects of the chart 250. Chart 280 in FIG. 6B illustrates the current 230 as a function of time 204. The total current 282 as well as the lithium-ion current 284 and the lead-acid current 286 are illustrated. Chart 300 in FIG. 6C illustrates the voltage 202 as a function of time 204. The observed behavior in the simulation may be similar to the one described in charts 220 of FIG. 5A and 228B of FIG. 5B. During a stop event 262, both batteries of the dual battery system may provide energy as the voltage decreases. Since the vehicle is stopped, the alternator may not provide any power in stop event 262 (e.g., if the engine is not running) During a start event 264, the ignition engine may use very large crank currents from the battery (event 264 in chart 280), which may result in rapid discharge and drop in the voltage (event 264 in chart 300). After the start event 264, the alternator is capable of restoring and sustaining the cruising voltage level 302, using power derived from the vehicle engine.

During braking events 268, the batteries may be charged by accepting currents (events 268 in chart 280). Note that the lithium-ion current 284 is substantially larger when compared to the lead-acid battery current 286 during braking events 268. As discussed above, this behavior may be desirable in order to improve efficient energy usage, and may be achieved by choosing a cruising voltage level 302 that is similar to the OCV of the lead-acid battery. Note further that during cruising events 266, currents provided by the lithium-ion battery 284 may also have larger magnitude than the currents provided by the lead-acid battery 286. This may be a result of a higher SOC of the lithium-ion battery that results from the larger charge received during braking events 268. Note further that during cruising events 266, the voltage 202 stays around the cruising voltage level 302. This may be accomplished, for example, through adequate control of alternator settings, as discussed above.

Chart 350 in FIG. 7 illustrates the fuel economy 352 that may be obtained by using dual battery systems that use the cruising voltage management strategies discussed herein. Fuel economy 352 is shown for a dual battery system having a lead acid battery and a lithium-ion battery of either an LTO type 354 or LFP type 356. Each of the dual battery systems was tested with a lead-acid battery with a high OCV 358 or a low OCV 360. For a dual battery system using lithium-ion cells of LTO type 354, the fuel efficiency slightly increases when the lead-acid battery OCV is lowered from a high OCV 358 (bar 362) to a low OCV 360 (bar 364). As illustrated, this effect is more pronounced in battery systems using lithium-ion cells of LFP type 356. For this type of battery system, the fuel efficiency increases more sharply when the lead-acid battery OCV is lowered from the high OCV 358 (bar 366) to the low OCV (bar 368).

As discussed above, the energy efficiency of a vehicle that uses a battery system as described herein may be improved through the use of a lead-acid battery that is configured to operate at a lower OCV. FIGS. 8A, 8B, 8C, and 8D provide an illustration of this effect in a battery system using an LFP type lithium-ion cell. Chart 400 illustrates current 402 for the LFP cell over time 204. The currents are shown for two OCV levels: a low OCV 404 and a high OCV 406. Focusing on the battery discharging events (region 408), note that in the low OCV 404, the LFP cell provides a larger amount of current 402 than at the high OCV 406. Note further that both batteries may receive a similar amount of current 402. This is an indication that, when matched with a lead-acid battery with low OCV 404, the LFP cell may be capable of charging and/or discharging in a more efficient manner. Note that the increased usage of the lithium-ion battery that leads to an improved efficiency may be balanced with the battery life of the lithium-ion battery.

The efficiency of the battery system with a lead-acid battery operating at a lower OCV is also seen in chart 420 in FIG. 8B. Chart 420 is a plot of accumulated charge throughput 422 over time 204 for the LFP lithium-ion battery. More specifically, chart 420 provides accumulated charge throughput 422 during charging and discharging events when the cruising voltage levels are managed in a dual battery system having a lead-acid battery operating at either a high OCV or a low OCV. The accumulated charge corresponds to the sum (e.g., integral) of all currents received by the LFP-based lithium-ion battery and the accumulated discharge corresponds to the sum (e.g., integral) of all currents provided by the LFP battery. Curve 424 provides the accumulated charge for the LFP battery matched with high OCV lead-acid battery, curve 426 provides the accumulated discharge for the LFP battery paired with a high OCV lead-acid battery, curve 428 provides the accumulated charge for the LFP battery paired with a low OCV lead-acid battery, and curve 430 provides the accumulated discharge for the LFP battery paired with a low OCV lead-acid battery. Note that for both cruising voltage levels, the LFP battery receives a similar accumulated charge (curves 424 and 428) with the LFP battery receiving more current when paired with a low OCV lead-acid battery (curve 428). However, the LFP cell provides significantly more charge when paired with a low OCV lead-acid battery than at high OCV lead-acid battery (curves 426 and 430). This result of chart 420 demonstrates that LFP cell may be storing energy with more efficiency when paired with a low OCV lead-acid battery, as it is able to provide larger current outputs with similar current inputs. In some situations, the increased usage of the lithium-ion battery may reduce the life span of the lithium-ion battery.

Figure 8D:
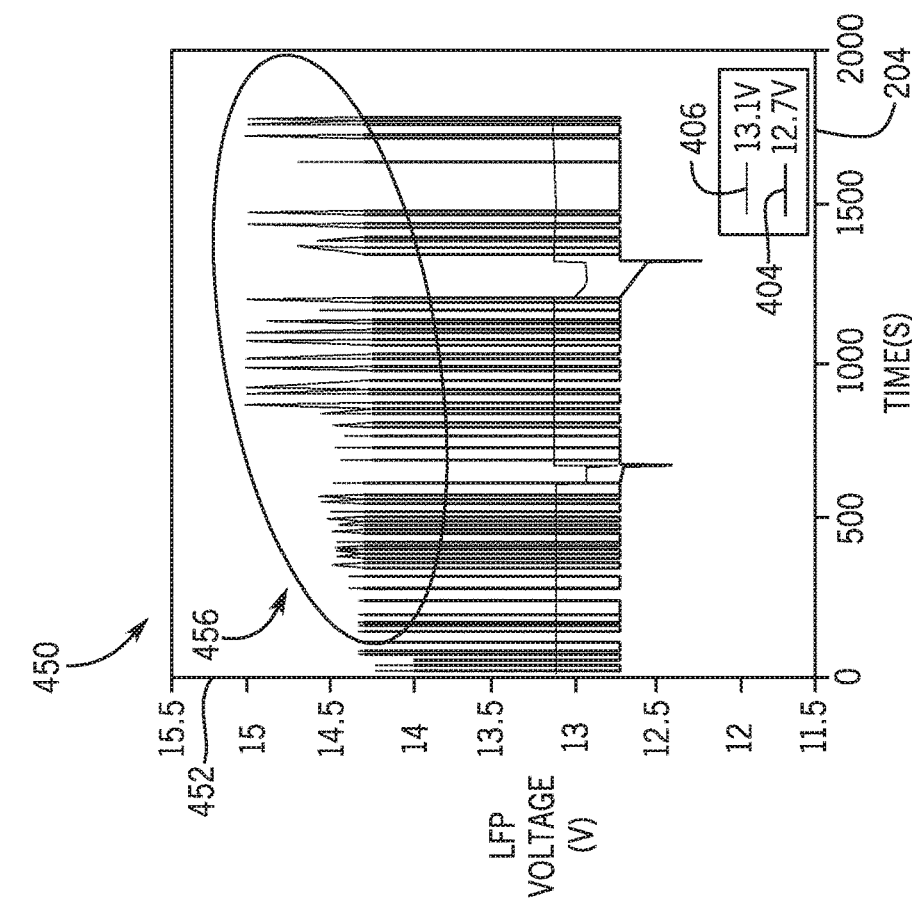
Figure 8C:
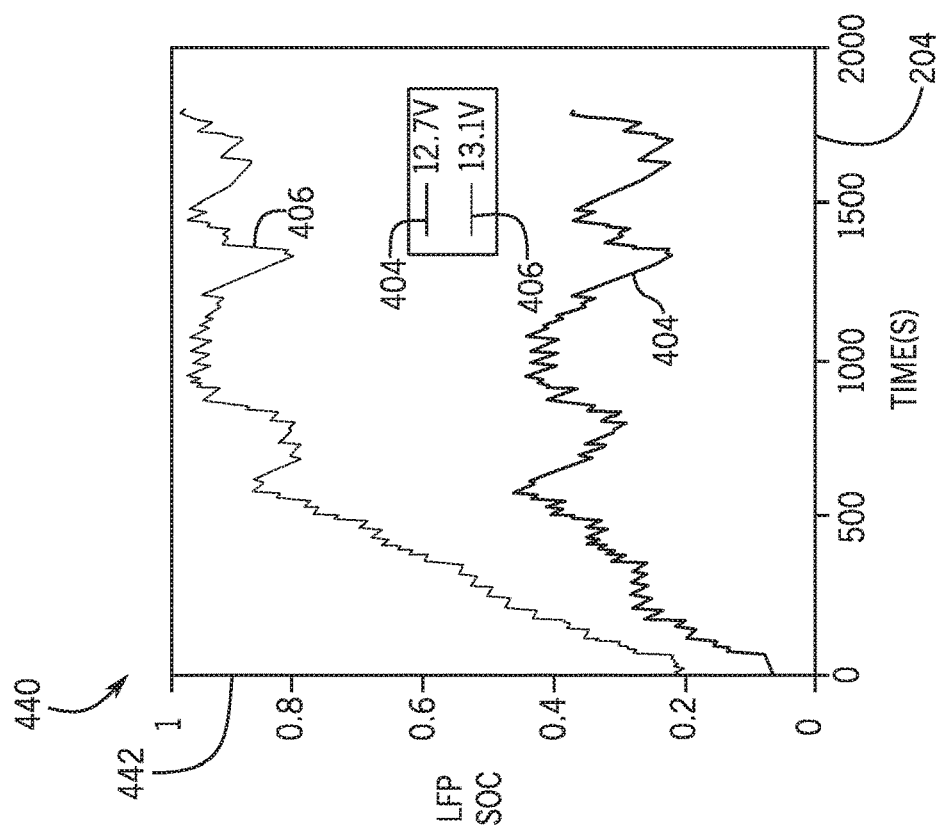

Chart 440 in FIG. 8C shows the SOC 442 over time 204 for the lithium-ion battery. Note that when matched with a lead-acid battery having a lower OCV 404 the SOC 442 of the LFP cell remains around 20%, in contrast with the SOC of the LFP-based lithium-ion battery matched with a lead-acid battery having a higher OCV 406. Note that, as discussed above, the cruising voltage level may be chosen based on the lead-acid battery OCV. Differences in the SOC between the LFP battery matched with a battery having lower OCV and higher OCV may be related to the differences in the cruising voltages. As discussed above with reference to chart 420, the lower OCV may improve the discharging capacity of the LFP battery which causes the reduced SOC for observed in the LFP battery matched with the lead-acid battery with lower OCV. Chart 450 in FIG. 8D shows the voltage 452 for the LFP battery over time 204. When matched with a lead-acid battery with lower OCV 404, the voltages observed during charging (region 456) are larger than the ones observed with a higher OCV 406 lead-acid battery.

As discussed above, the choice of the OCV of the lead-acid battery may change the fuel efficiency of a vehicle using the dual battery system. As noted in chart 350, some types of lithium-ion battery cells may have an increased sensitivity for fuel efficiency with respect to lead-acid battery OCV. FIG. 9A and FIG. 9B illustrate how the OCV profile (i.e., the relationship between the OCV of a battery and its SOC) may influence this sensitivity. Chart 500 in FIG. 9A shows a plot of the open circuit voltage (OCV) 502 of batteries with respect to the SOC 122 of the batteries, as well as the OCV 502 for a lead-acid battery having a high OCV 504 and a low OCV 506, as a function of the SOC 122. Note that both the high OCV 504 and the low OCV 506 lead-acid batteries show an affine relationship (i.e., constant slope) over the entire SOC range. Chart 500 also shows the OCV 502 of an LFP battery (LFP battery curve 508) as a function of the SOC 122, as well as a maximum charge voltage level 510. Two cruising voltage level lines are also shown in chart 500, including a high cruising voltage level 512 (used with a high OCV lead-acid battery), and a low cruising voltage level 514 (used with a low OCV lead-acid battery).

In certain embodiments, the high sensitivity in the fuel economy with respect to changes in the cruising voltage level that was observed in LFP batteries may be related to the slope of the OCV 502 of the LFP battery curve 508 with respect to the SOC 122. A slope 516 of the LFP battery curve 508 with respect to the OCV 502 at the high cruising voltage 512 is smaller than the slope 518 of the same curve at the low cruising voltage 514. The smaller slope 516 may correspond to a situation in which a large increase in the SOC 122 may be associated with a small increment in the OCV 122. In certain battery systems described herein, this may indicate that a large decrease in the SOC may not lead to a substantial change in the OCV of the LFP battery (see LFP battery curve 508), which may be associated with a reduced efficiency when providing stored energy, as discussed above. In contrast, chart 520 of FIG. 9B shows that the LTO battery curve 522 has a slope 526 at both the lower cruising voltage level 514 that is similar to the slope 528 at the higher cruising voltage level 512. As a result, LTO battery discharge when paired with either the high OCV lead-acid battery or the low OCV lead-acid battery (see LTO battery curve 522).

As set forth above, it may be recognized that the maximum OCV level of the lead-acid battery may be chosen to maximize the slope of the OCV profile of the lithium-ion battery. Furthermore, the OCV of the lead-acid battery may be chosen such that the cruising OCV of the lithium-ion battery may be lower, resulting in a reduced SOC during operation of the battery system. It is also now recognized that, in operating a battery system (e.g., battery system 12) as described herein, increasing the cruising voltage to a value close to the OCV of the lead-acid battery may direct charging currents towards the lithium-ion battery during regenerative braking events.

While adjustments to the cruising voltage level and/or the maximum charge voltage level may increase fuel efficiency through an increase in the total charge throughput via the lithium-ion battery, this effect is accompanied by an increase in the amount of charging and discharging. This increase in the amount of accumulated charge may lead to a decreased span of time for the lithium-ion battery leading to shorter maintenance cycle. As a result, in situations where the life span of the battery is more important than the fuel efficiency, the cruising voltage level and/or the maximum charge voltage level may be adjusted to increase the life span of the battery. In other words, embodiments of the present disclosure also enable the management of cruising voltage to balance lithium-ion battery life with fuel efficiency.

With the foregoing in mind, method 600 of FIG. 10 illustrates a method to manage battery systems having a lead-acid battery and a lithium-ion battery by regulating voltages such as the cruising voltage and the maximum charge voltage of the electrical system of the vehicle powered by the battery system. In some embodiments, method 600 is capable of providing to a vehicle or a vehicle component (e.g., a VCU) recommended voltages to be set across the battery system based on performance goals for the vehicle and battery, battery data, vehicle data and environmental data. In other embodiments, method 600 may directly adjust the recommended voltages in the system. Method 600 may be performed by a controller in the vehicle control unit (VCU), in a battery management system (BMS), in a battery circuit board, or in any other module that may access and/or store data to perform the method. This process may include an initialization process for the controller (box 602) which may include an initialization of parameters and acquisition of specifications of the vehicle and the battery. For example, during the initialization (box 602), the controller may receive an initial state of health (e.g., capacity loss, internal resistance), state of charge for the batteries, OCV profiles (e.g., OCV as a function of the SOC for the batteries), parameters for the alternator, average electrical loads, fuel consumption history, and parameters related to driving pattern.

Method 600 may include a process for receiving vehicle data and usage profile for the battery system (box 604). This data may update stored specifications or parameters in the controller that were acquired during initialization (box 602). For example, the controller may receive changes to the driving pattern (e.g., conservative, regular, aggressive), vehicle fuel level, average speed, power demands from the load, etc. The controller may also receive battery data (box 606) such as voltages and currents in the battery terminals and updates to the SOC and/or SOH. The controller may also receive environmental data (box 608) such as temperature and/or humidity in the battery, engine, and exterior. Note that the processes for acquisition of vehicle data (box 604), battery data (box 606) and environmental data (box 608) may take place in any order. Furthermore, the controller may be able to provide control voltages even if it receives a subset of the data (e.g., one or more sets of data from boxes 602, 604, 606, and 608).

Based on the data obtained during controller initialization (block 602) as well as during operation (boxes 604, 606, and 608), the controller may provide a control voltage (box 610). The controller may provide recommended values for a maximum charging voltage and a cruising voltage to improve the performance of the battery system with respect to a target goal. Changes may also be made with respect to the present cruising voltage (e.g., the controller may recommend a 5% increase relative to the present current voltage or a 15 mV increase in the present voltage). As discussed above, the target goal may be fuel efficiency, battery life span or other operating goals that are related to battery usage. The maximum charging voltage may be increased if, for example, aggressive charging during regenerative braking events is desired, and it may be decreased if extending the operating life of the battery is prioritized. Similarly, increases in the cruising voltage may lead to increased current flows directed to the lithium-ion battery during relative to the lead-acid battery regenerative braking, as discussed above. In certain situations, the controller may have hard limits and/or default levels for the voltages, which may be employed to prevent faulty behavior when data is corrupt or incomplete, or when the recommended voltage level is excessively high or low. In certain situations, an increase in battery temperature may be followed by an increase in the cruising voltage level to protect the lithium-ion battery.

Changes in the cruising voltage may be further adjusted based on other situations. For example, in cold weather, the lithium-ion battery may present plating issues if it receives large currents during regenerative braking. In such situations, it may be recommended to adjust the maximum charging voltage and/or adjust the cruising voltage to reduce charging currents until the lithium-ion battery warms up. In another situation, if the projected life span of the lithium ion battery is below an expected life span, the cruising voltage may be reduced to decrease the accumulated charge in the lithium-ion battery and increase the projected life span. In a further example, if the lead acid battery SOC is lower than a desired level due to, for example, driving patterns, the cruising voltage may be raised to increase the SOC of the lead-acid battery and protect the lead-acid battery life. The controller may also allow for improved fuel economy based on dynamic balancing of charges and discharges in the batteries. For example, if a particularly long or strong regenerative braking event generates a large charge to be stored in an ESS, the controller may decrease the cruising voltage to maximize the discharge by the ESS and dynamically return the cruising voltage to a previous level.

The process for calculation of recommended voltages may be performed iteratively (e.g., substantially continuously during operation of the vehicle 10) (loop 612). In such embodiments, parameters received during processes indicated by boxes 604, 606, and 608 may be stored in a memory of the controller to produce a history of the vehicle 10. The history of the vehicle 10 may be used as in input (out of several) to provide recommended voltage levels, as described above. Note further that the recommended voltage levels in method 600 may be voltage levels provided to configure the alternator set level, or for some other switching mechanism in the electrical circuit powered by the dual battery system.

The above methods may be beneficial to apply over the lifetime of the battery. The characteristics of different types of batteries may change in different ways over the lifetime. Accordingly, a dynamic adjustment to the cruising voltage that adapts to the changes in the OCV profile and capacity as the battery ages may improve the life span of the battery system. Note that the methods and systems described herein are not limited to dual battery systems, where current split may be managed. It may also be used in either multiple or stand-alone energy storage systems. Changes in cruising voltage levels provide a method to manage SOC as well as charge and discharge currents in multiple batteries without direct control of the batteries.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the disclosed subject matter. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery system, comprising:
    a lead-acid battery connected to a power bus of an electrical system of a vehicle;
    a lithium-ion battery connected to the power bus of the electrical system in parallel with the lead-acid battery; and
    a controller coupled to the electrical system, wherein the controller is configured to:
    receive battery data relating to the lead-acid battery and the lithium-ion battery;
    receive a performance target; and
    calculate a recommended cruising voltage for the electrical system of the vehicle based on the performance target and the battery data, and wherein the controller is configured to set a voltage of the power bus to the recommended cruising voltage.

2. The battery system of claim 1, wherein the electrical system comprises an electrical generator connected to the power bus in parallel with the lead-acid battery and the lithium-ion battery, and the controller is configured to set an operating voltage of the electrical generator to the recommended cruising voltage.

3. The battery system of claim 1, wherein the performance target comprises a lifespan of the lithium-ion battery, a lifespan of the lead-acid battery, or fuel economy of the vehicle.

4. The battery system of claim 1, wherein calculating the recommended cruising voltage comprises calculating a cruising voltage configured to increase a current received by the lithium-ion battery relative to a current received by the lead-acid battery during a charging event.

5. The battery system of claim 1, wherein the battery data comprises a state of health, a state of charge, or an open circuit voltage profile, or any combination thereof.

6. The battery system of claim 5, wherein the state of health comprises a capacity loss of a battery of the battery system or an internal resistance of the battery or both.

7. The battery system of claim 1, wherein the controller is configured to receive environmental data, and wherein calculating the recommended cruising voltage comprises calculating the recommended cruising voltage based at least on the environmental data, the battery data, and the performance target.

8. The battery system of claim 7, wherein the controller is configured to calculate a recommended maximum charging voltage based at least on the environmental data, the battery data, and the performance target.

9. The battery system of claim 1, wherein the performance target is a fuel economy target, and wherein the recommended cruising voltage is substantially similar to an open circuit voltage of the lead-acid battery in a state of charge that is high relative to the open circuit voltage of the lithium-ion battery.

10. The battery system of claim 1, wherein the battery data related to the lithium-ion battery comprises an open circuit voltage profile of the lithium-ion battery, and wherein calculating the recommended cruising voltage comprises determining a first voltage that intercepts the open circuit voltage profile in a region presenting a slope steeper relative to other portions of the open circuit voltage profile.

11. The battery system of claim 1, wherein when the performance target is a battery lifespan target, and wherein the recommended cruising voltage is configured to reduce charging currents to the lithium-ion battery relative to a charging current received by the lead-acid battery during braking events.

12. The battery system of claim 1, wherein the recommended cruising voltage is provided to a vehicle control unit of the vehicle.

13. The battery system of claim 1, wherein the controller is configured to receive vehicle data comprising fuel consumption history.

14. The battery system of claim 1, wherein the battery data comprises charging and discharging histories and the performance target comprises dynamic balancing between accumulated charging and discharging in the lithium-ion battery or the lead-acid battery or both.

15. The battery system of claim 1, wherein the controller is contained within the lithium-ion battery.

16. An energy system for a vehicle, the energy system comprising:
   a battery system configured to be coupled to a power bus of an electrical system of the vehicle, the battery system comprising:
      a first battery connected to the power bus, wherein the first battery comprises a lead-acid battery; and
      a second battery connected to the power bus arranged in a parallel circuit with the first battery, wherein the second battery comprises a lithium-ion battery;
   a control module configured to couple to the electrical system of the vehicle, the control module being configured to:
   receive a performance target;
   receive first data from the first battery of the battery system;
   receive second data from the second battery of the battery system; and
   calculate a recommended cruising voltage for the power bus based on the performance target, the first data, and the second data, wherein the control module is configured to set a voltage of the power bus to the recommended cruise voltage.

17. The energy system of claim 16, comprising an alternator coupled to the power bus, wherein the control module is configured to set an operating voltage of the alternator to the recommended cruising voltage.

18. The energy system of claim 16, wherein a nominal voltage of the electrical system of the vehicle is about 12V and wherein the recommended cruising voltage is between 10V and 15V.

19. The energy system of claim 16, comprising a regenerative braking system, and wherein the recommended cruising voltage causes the electrical system of the vehicle to provide a larger portion of a charging current from the regenerative braking system to the first battery.

20. The battery system of claim 2, wherein the electrical generator comprises an alternator.

\* \* \* \* \*